United States Patent [19]
Berstis et al.

[11] Patent Number: 6,115,745
[45] Date of Patent: Sep. 5, 2000

[54] SCHEDULING OF DISTRIBUTED AGENTS IN A DIALUP NETWORK

[75] Inventors: Viktors Berstis, Austin; Joseph Raymond Thompson, Round Rock, both of Tex.

[73] Assignee: International Business Machines Corporation, Armonk, N.Y.

[21] Appl. No.: 08/977,750

[22] Filed: Nov. 25, 1997

[51] Int. Cl.$^7$ .............................. G06F 13/14; G06F 15/16
[52] U.S. Cl. ........................................... 709/227; 709/102
[58] Field of Search ...................................... 370/229, 230, 370/232; 709/224, 225, 226, 235, 250, 100, 102, 103, 104, 227, 228, 229; 707/8

[56] References Cited

U.S. PATENT DOCUMENTS

| | | | |
|---|---|---|---|
| 4,642,758 | 2/1987 | Teng | 707/10 |
| 5,682,325 | 10/1997 | Lightfoot et al. | 709/229 |
| 5,740,075 | 4/1998 | Bigham et al. | 709/229 |
| 5,832,483 | 11/1998 | Barker et al. | 707/8 |
| 5,920,701 | 7/1999 | Miller et al. | 709/228 |
| 5,951,644 | 9/1999 | Creemer | 709/229 |
| 5,983,004 | 11/1999 | Shaw et al. | 709/227 |

*Primary Examiner*—Dung C. Dinh
*Attorney, Agent, or Firm*—Jeffrey S. LaBaw; David H. Judson

[57] ABSTRACT

A method of managing a plurality of client machine "Web agents" vying for a resource in a computer network having a central authority. The resource may be a limited number of telephone connections in a dialup telephone network. At each client machine, a map of available agent start times is generated based on resource usage statistics and given scheduling criteria distributed by the central authority. Using this information, an available agent start time is selected at random from the map. This start time is then set as a "regular" start time at which the particular agent initiates some agent activity on behalf of a user of the client machine. If, however, the client machine is unable to obtain access to the resource according to a given criteria, the map of available agent start times is then regenerated to enable the agent associated with the client machine to reschedule itself to a new start time for the agent activity. Thus, each agent performs its own scheduling based on the resource usage statistics and/or given scheduling criteria distributed from the central authority.

33 Claims, 6 Drawing Sheets

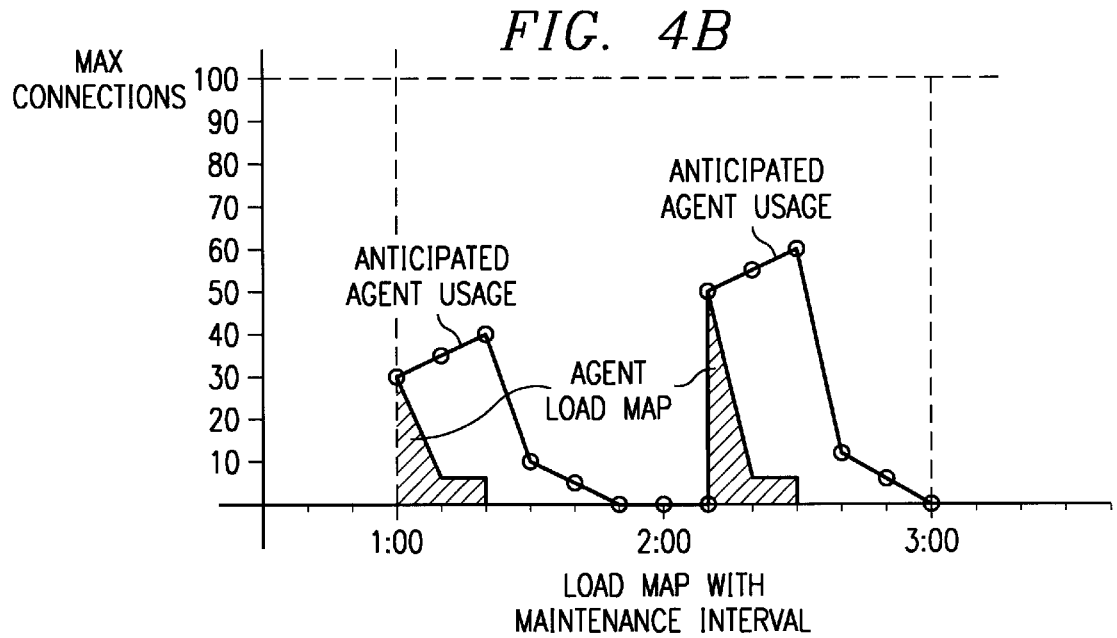
FIG. 4B
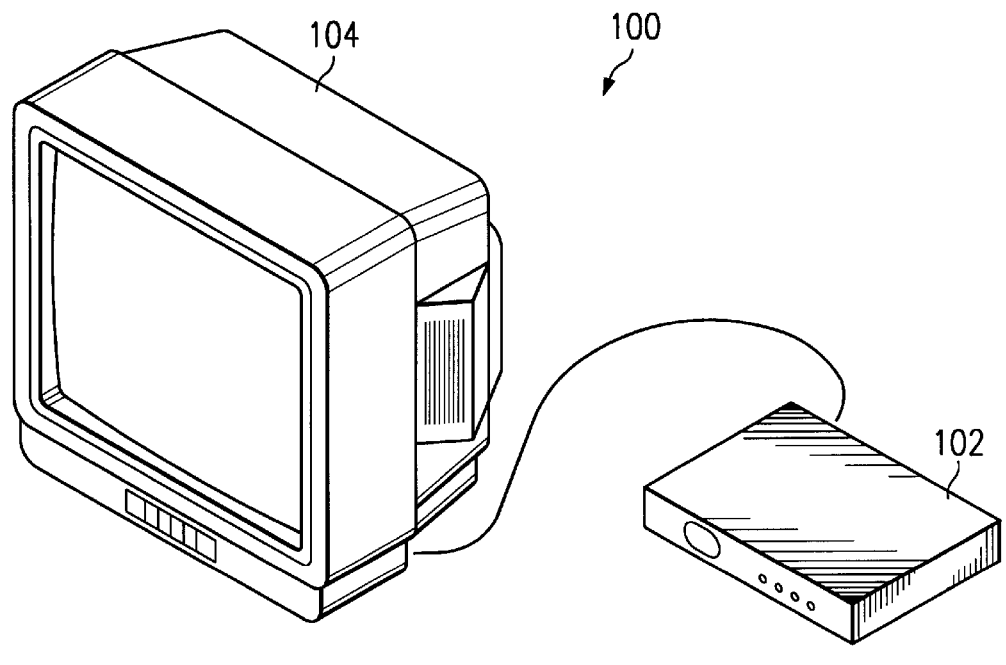
FIG. 5A
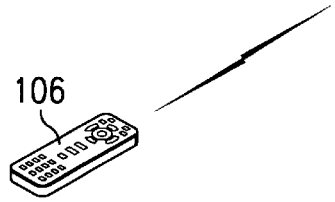

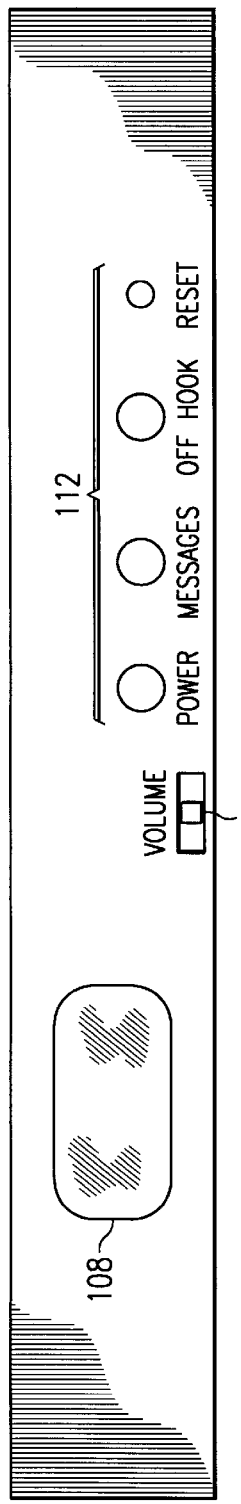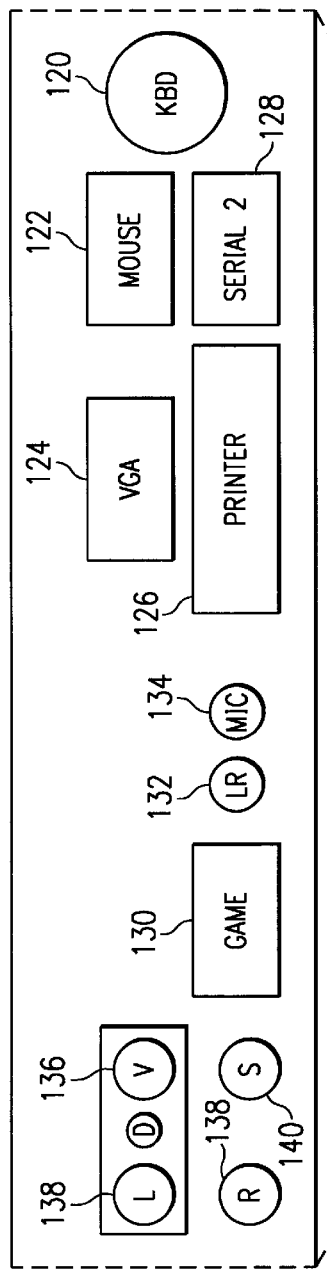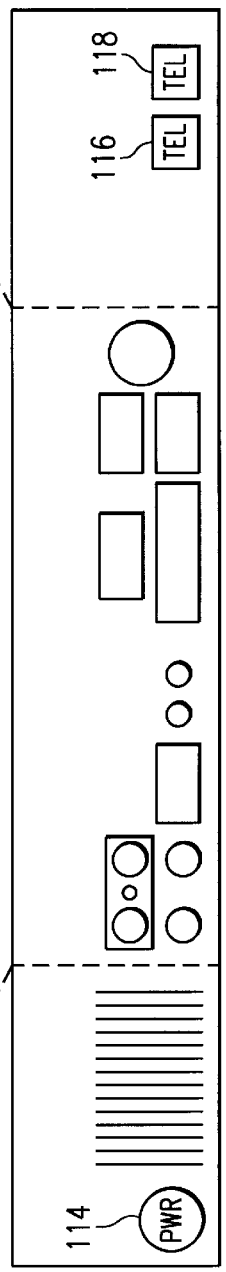
FIG. 5B
FIG. 5C

SCHEDULING OF DISTRIBUTED AGENTS IN A DIALUP NETWORK

BACKGROUND OF THE INVENTION

1. Technical Field

The present invention relates generally to resource management in a computer network and, in particular, to a method for enabling multiple client "agents" to establish and maintain their own "schedules" to enable more efficient sharing of telephone network resources in a dialup telephone network.

2. Description of the Related Art

There has been great interest in providing Internet access at minimal economic cost. While most computers now are preconfigured for such access, a significant percentage of households still do not have a personal computer. Thus, it has now been proposed to provide a data processing system that, much like a VCR, may be connected to a television set and used in lieu of a personal computer to provide World Wide Web access through a conventional remote control device associated with the system unit. Such a system enables the television to become, in effect, a "Web" appliance. The viewer can rapidly switch between conventional television and Internet access using the remote control unit. All of the conventional "Internet" access tools and navigational functions are preferably "built-in" to the system and thus hidden to the user.

It is known in such environments for providers of online services to provide "Web agent" technology to users of their Web appliance or "clients machines. A Web agent is an application running on a client machine that performs one or more Internet-related task(s) on behalf of the user of the machine. Such tasks may include, for example, prefetching world Wide Web content during off-line hours, filtering prefetched content, downloading software upgrades, e-mail retrieval, and the like. Theoretically, one would want to "schedule" a Web agent's activities to peak levels during regular "off-peak" nighttime hours. Other client machines would pursue a similar strategy. As the number of Web agents connected over a dialup network increases, however, network bottlenecks occur.

In particular, one of the main problems associated with such agent implementations or the prior art is that all Web agents "dial in" whenever they want and use the phone connection for as long as they want. Thus, Web agents acting without centralized control tend to use network resources in a greedy fashion. In a dialup network, this can cause an unfair distribution of network resources, as well as wasted telephone network resources used to handle large quantities of busy signals.

One approach to solving this problem has involved the service provider actually hanging up on connections that have been overly active (e.g., through a rapid retrieval of multiple URLs) for more than a certain period of time. This operation "frees-up" phone connections so that other users/agents then get an opportunity to dial-in for service. Although this approach does attempt to provide some degree of load balancing across multiple agents, it has not worked well because the technique still requires clients to dial the phone repeatedly until they connect (i.e. until they stop getting a "busy" signal). This is quite wasteful of phone network resources. It also does nothing to guarantee that all clients get equal time.

One alternative approach might be the use of a "load balancing" scheme implemented by the service provider centrally on a single server. This would involve having the ISP setting the individual schedules for all the client agents in a deterministic way. This approach, however, is also has significant drawbacks, namely, the requirements of centralized management of the agents and distribution of the schedules from the ISP to each client individually. Still another option is to provide load balancing by the ISP across distributed servers. That approach, however, still requires that the ISP distribute the schedules individually.

The present invention addresses and solves this problem.

SUMMARY OF THE INVENTION

It is thus a primary object of this invention to enable client "agents" to set their schedules independently based on statistics and other criteria distributed to them by a central authority.

It is still another object of this invention to provide a scheduling mechanism that allows Web agents to act in an autonomous, yet coordinated fashion under decentralized control of a given authority, such as an Internet Service Provider. The mechanism is distributed so that the authority has no direct control over an individual client agent schedule.

It is yet another object of this invention to enable each individual agent to schedule its own network activities by executing a load balancing algorithm against resource usage statistics and given scheduling criteria shared by a plurality of agents (including the individual agent) connected over the same dialup connection.

A still further object of this invention is to conserve limited network resources in a dialup computer network environment.

It is thus another object of this invention to afford a central authority more general control over Web agents, while providing fair distribution of network resources.

Another object is to distribute the agent load in a manner that does not interfere with the non-agent users.

Yet another object of this invention is to provide for efficient use of telephone network resources in an environment wherein a plurality of Web "appliances" are connected through a dialup computer network to an Internet Service Provider gateway.

It is still another important object of this invention to centrally manage Web agent schedules (e.g., start times and durations) yet enable individual agents to determine their own start times pseudorandomly.

These and other objects of the invention are provided in a method for centralized management of agent schedules in a dialup computer network environment. With this method, agents determine their own start times in a pseudorandom fashion within a "time space" defined by an "agent load" or weight table generated from information provided by a central authority such as an Internet Service Provider. Preferably, the "duration" of some given event in a given agent schedule is controlled directly by the central authority. This method allows the central authority to distribute agent load throughout the day with varying levels of activity and with some degree of fairness. The level of activity with respect to the set of agents is controlled by the agent load table supported at each client machine. The weighted table provides substantial scheduling flexibility.

These and other objects are provided in a method of managing a plurality of client machine "Web agents" vying for a resource in a computer network having a central authority. The resource may be a limited number of telephone connections in a dialup telephone network. At each client machine, a map or "set" of available agent start times is generated based on resource usage statistics and given scheduling criteria distributed by the central authority. Using this information, an available agent start time is selected at random from the map. This start time is then established and used as a "regular" start time at which the particular agent initiates some agent activity on behalf of a user of the client machine. If, however, the client machine is unable (at the "regular" start time) to obtain access to the resource according to a given criteria, the map of available agent start times is then regenerated (i.e. a new set of possible start times is generated) to enable the agent associated with the client machine to reschedule itself to a new start time for the agent activity. Thus, each agent performs its own scheduling based on the resource usage statistics and/or given scheduling criteria distributed from the central authority.

In a dialup network implementation, the resource usage statistics may define the number of telephone connections of the dialup network in use by non-agents during each of a given number of time intervals. The given scheduling criteria preferably defines an operating window during which each of the agents may perform activities, as well as a "duration" of a given event during the operating window. Thus, for example, the given event is a maintenance period during which the central authority performs a maintenance function.

The central authority thus makes some generic parameters (e.g., an operating window and a duration for agent activity within that window) available to all clients. The clients then set their own schedules independently using a statistical distribution and a self-correcting mechanism. Once an agent's schedule is set, the agent runs at that same set time every day unless the agent determines that it needs to reschedule itself. In the preferred embodiment, this determination is made by determining whether an agent connect success/failure ratio exceeds a given threshold. If so, the agent regenerates the start time map, and the agent activity is then initiated at an available agent start time selected from the regenerated map. With multiple agents scheduling themselves in this manner, the result is efficient and robust shared use of telephone network resources without the management problems associated with centralized scheduling.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description of the Preferred Embodiment taken in connection with the accompanying drawings in which:

FIGS. 4A–4B illustrate plots of Usage Statistics and a corresponding load map during an ISP maintenance interval;

FIG. 5A is pictorial representation of a data processing system unit connected to a conventional television set to form a "Web" appliance;

FIG. 5B is a pictorial representation of a front panel of the data processing system unit;

FIG. 5C is a pictorial representation of a rear panel of the data processing system unit;

DETAILED DESCRIPTION OF THE PREFERRED EMBODIMENT

Figure 1:
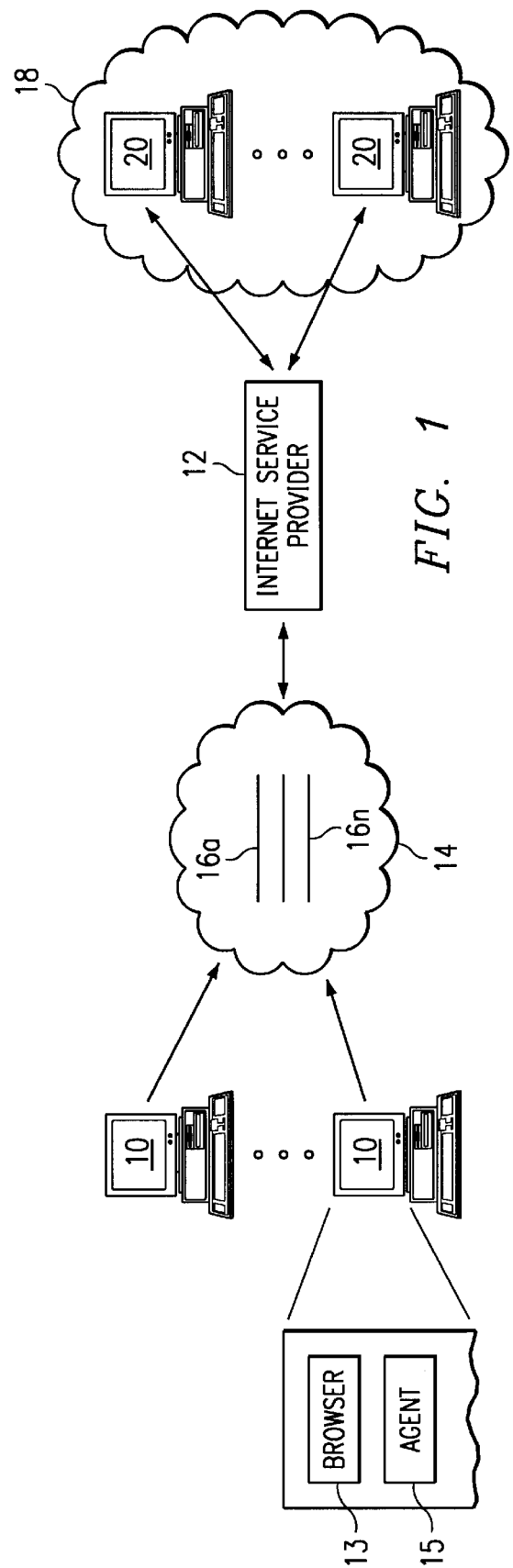
FIG. 1 is a representative system in which the present invention is implemented.

A representative system in which the present invention is implemented is illustrated in FIG. 1. A plurality of Internet client machines 10 are connectable to a computer network Internet Service Provider (ISP) 12 via a "resource" such as a dialup telephone network 14. As is well known, the a dialup telephone network usually has a given, limited number of connections 16a–16n. ISP 12 interfaces the client machines 10 to the remainder of the network 18, which includes a plurality of Internet server machines 20. A client machine typically includes a suite of known Internet tools (e.g., Web browser 13) to access the servers of the network and thus obtain certain services. These services include one-to-one messaging (e-mail), one-to-many messaging (bulletin board), on-line chat, file transfer and browsing. Various known Internet protocols are used for these services. Thus, for example, browsing is effected using the Hypertext Transfer Protocol (HTTP), which provides users access to multimedia files using Hypertext Markup Language (HTML). The collection of servers that use HTTP comprise the World Wide Web, which is the Internet's multimedia information retrieval system.

Each client machine has associated therewith a particular software routine 15 or "Web agent". The Web agent 15 is designed to perform some Internet-related task(s) for the user of the client machine. The agent is preferably a client application (although it may be implemented with the browser as a plug-in, or with a client-side proxy, or as a standalone application). Alternatively, the agent is built into the browser, or it is implemented as a Java applet or standalone application. Thus, as used herein, the agent 15 is any application running on a client machine 10 that performs task(s) on behalf of the user(s) of that client. The agent may act as a productivity enhancer for the end user by doing time consuming tasks. It may also provide or facilitate some "value added" function such as improving the quality of the content display in some known manner.

Thus, for example, a Web agent 15 is used for prefetching Web content during off-line hours. This content is usually cached on the client's local storage for viewing later. Another agent function is filtering prefetched content. One well known form of filtering is "searching." Searching would prefetch web pages, search for text strings of interest to the user, discard pages that have no matches, or cache pages that have matches. This function enables the agent to find pages with specific content of interest to the user. Another agent function is downloading client software upgrades or fixes and installing them automatically. Still another function is downloading of e-mail for caching on the client's local storage so that the user can view the e-mail later without having to wait for a network download. The Web agent may also provide clock synchronization. The particular agent function(a), as can be seen, are quite varied.

The present invention provides a method for centralized management of Web agent schedules in the dialup computer network environment of FIG. 1. With this method, each Web agent determines its own "start" time in a pseudorandom fashion within a "time space" defined by an "agent load" or weight table provided by the Internet Service Provider. Preferably, the overall operating window (i.e. start time and stop time) of all agents, as well as the "duration" of one or more given events (e.g., a maintenance period during which the ISP performs maintenance on its associated server machines) within that operating window, are controlled or set directly by the central authority. The individual agent, however, sets its own start time. According to the invention, load balancing across the "resource" is then achieved by having each agent adjust its start time dynamically—but only as necessary—to account for changing conditions that impact an agent's ability to "seize" or obtain the resource (in this example, a particular dialup network connection). This method allows the ISP to distribute agent load throughout the day with varying levels of activity and with a given degree of fairness.

Figure 2:
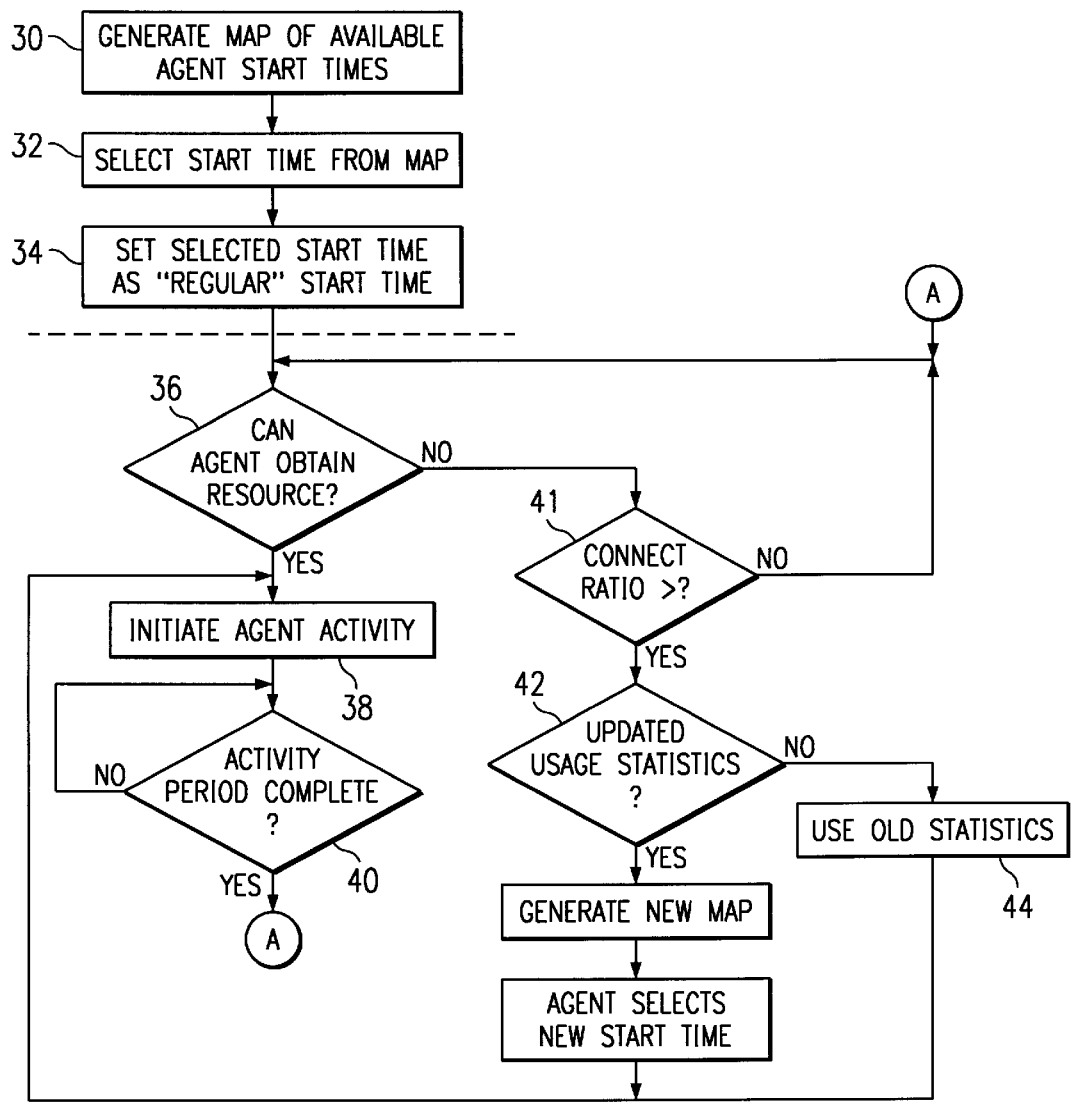
FIG. 2 is a flowchart of a preferred agent scheduling routine of the present invention implemented at a particular client machine.

FIG. 2 is a flowchart illustrating the basic agent scheduling function. This particular routine is run on each of the client machines that incorporate this functionality. Of course, it is not required that all client machines connected to the ISP via the dialup network connection run this routine; however" only those client machines that execute this function are "load balanced" across the connection. The routine begins at step 30 with the generation of a "map" of available agent start times. As will be described in more detail below, the "map" of possible start times is based on resource usage statistics and given scheduling criteria distributed to the agent by the central authority. The resource usage statistics are preferably derived from resource consumption by non-agent users. This enables the inventive technique to distribute agent load in a manner that does not interfere with the non-agent users. The "map" is sometimes referred to herein is as an "agent load table" or a "weighted table".

At step 32, a particular start time is selected from the map. Preferably, the start time is selected at random, although some more deterministic method may be used. At step 34, the selected start time is then set as the "regular" or established start time for the agent. This start time will then be used each time the agent is to initiate its activity (usually, once per day). At step 36, (typically upon dialup), a test is run to determine whether the agent is able to obtain one of the limited number of network connections according to some given criteria as described in more detail below. If the outcome of the test at step 36 is positive, the routine continues at step 38 with the initiation of the agent activity. At step 40, a test is run to determine whether the activity period is complete. If not, the routine cycles. If, however, the activity period is complete, the routine returns to step 36 and waits for the next dialup connection to be established (usually, the next day).

If, however, the outcome of the test at step 36 is negative, which indicates that the agent cannot obtain a dialup connection according to the given criteria, the routine branches to step 42. At this point, the routine continues at step 41 to check it an agent connect success/failure ratio exceeds a given threshold. If not, control returns to step 36. If, however, the outcome of the test at step 41 is positive, the routine branches.

At step 42, a test is made to determine whether updated usage statistics have been received from the central authority since the last time the agent generated the map. If the result of the test at step 42 is negative, the routine continues at step 44 to retrieve a map that was generated previously and the saved. It then continues at step 48. If, however, the result of the test at step 42 is positive, the routine continues at step 46 with the agent generating a new map or set of agent start times. Step 46 may also be described herein as a regeneration of the map. At step 48, the agent then selects an agent start time from the new map. Preferably, this selection is also made at random. The routine then returns to step 38. This completes the processing.

Thus, at each client machine in which the inventive function is implemented, the particular agent activity is regularly initiated at an available agent start time selected from a set of available start times. If a given client machine is unable to obtain one of the limited number of telephone connections according to a given criteria, the map of available agent start times is then regenerated to enable the agent associated with the given client machine to reschedule a new start time for the agent activity. The available start time "maps" are generated using resource usage statistics (preferably collected with respect to non-agent users) and other scheduling criteria maintained by the central authority. Such information is distributed to the agents periodically or on an "as-needed" basis.

Although in the preferred embodiment the agent load "map" is regenerated whenever the agent connect success/failure ratio exceeds a given threshold), one could merely select a different start time from the then-existing map instead of regenerating the map. Yet another alternative is to merely build the agent load map each time new usage statistics are distributed by the central authority. Moreover, although scheduling with "start times" is preferred, this is not a requirement of the invention either. One could schedule the agent with respect to any given time.

As noted above, the level of activity with respect to the set of agents is controlled by the agent load table supported at each client machine. The weighted table provides substantial scheduling flexibility. Each agent will have generated its own associated agent load table.

For example, agent activity would normally be set to peak levels during regular off-peak nighttime hours. But the service provider could also mandate that no agent activity may take place over a given period. Thus, the ISP would require that all activity stop for a given period for scheduled maintenance service. In the example shown in FIG. 4A, there is a 20 minute service interval from 1:50–2:00 for regularly scheduled service of the ISP's servers. In this example, the ISP has in effect altered the usage statistics to prevent agents from scheduling themselves to be connected during the maintenance interval.

As noted above, once an agent's schedule is set, the agent preferably runs at that same set time every day unless the agent determines that it needs to reschedule itself. The mechanism for determining whether a given agent needs to reschedule its start time is now described.

The routine begins each day that the agent runs. After the very first attempt to connect, the agent checks its connect success/failure rate to see if it is regularly connecting successfully on the first attempt of the data at the selected time. This information can be saved in a file as a bit mask (see BusyHistory in the INI file section described below). When too many busy signals (see overload Threshold in the INI file section) are encountered over a period of time (see BusyHistoryLength in the INI file section), the result of the test is negative. The routine then continues with the agent generating a new start time map via the load balancing algorithm. The routine preferably inserts a reschedule delay (see RescheduleDelay in the INI file section) to prevent the start time from being rescheduled too often. For example, if a busy condition is encountered on the very next night after rescheduling, it may be too soon to attempt yet another reschedule.

The load balancing algorithm distributes the load of many Web appliances over a period of time without interfering with an ISPs typical non-agent usage load. A preferred embodiment of that algorithm is now described. The inputs to the load balancing algorithm are as follows:

1. usagestatistics—An array of usage statistics indicating the number of connections in use at each time interval starting at midnight; e.g. {21, 18, 15, . . . , 13, 14, 17, 25, 50, . . . }. This array would represent 21 active connections at 12:00 AM, 18 active connections at 12:10 AM, etc. This array is merely representative. The usageStatistics preferably represent non-agent users of the available dialup connections. According to the invention, agents preferably do non consume a portion of the connections used by non-agents.

2. deltaTime—The sampling interval for the usage statistics, e.g. 10 minutes. The sample interval preferably divides evenly into 1440 (i.e. 24 hours).

3. startTime—The beginning of the Web appliance maintenance interval, e.g. 1:00 AM. This time is a multiple of deltaTime.

4. stopTime—The end of Web appliance maintenance interval, e.g. 5:00 AM. This time is a multiple of deltaTime.

5. duration—The connect time for maintenance. This time is also a multiple of deltaTime.

6. maxUsage—The maximum number of connections that the Internet Service Provider (ISP) supports.

The scheduling algorithm is applied to these inputs. An intermediate output of the algorithm is the agent load map, which is a weighted map of start times. The particular agent load map for the agent defines the "time space" from within which the Web appliance selects a start time, preferably at random.

The algorithm generates the agent load map as follows:

```
given:  deltaTime (in minutes)
        startTime and stopTime (in minutes relative to 12:00 AM)
        duration (in minutes)
        maUsage (in number of connections)
        u(t)=usage statistics
        L(t)=load map
        agentUsage(t)=the predicted agent usage statistics
then:   startindex=startTime/deltaTime
        stopindex=stopTime/deltaTime
        durationindex=duration/deltaTime
            for:    (startindex(t((stopindex−durationindex)){
                    L(t)=maxUsage−max{u(t), u(t+1), ...,
                    u(t+durationindex−1)}−agentUsage(t)
                    if L(t)<0, thenL(t)=0
                    for:  (t(x((stopindex−durationindex) {
                        agentusage[x]±L(x)
                    }
            }
            L(t)=0       for:  all other t.
The resulting load map is then used to select the
scheduled time as follows:
given:   L(t)
then:    n=sum(L(t))
         s=(rand( )%n)+1      where: % represents a modulo divide
         scheduleindex=x      where: x corresponds to the t where
                              s falls in L(t)
         scheduleTime=
         scheduleindex*deltaTime  where: scheduleTime represents
                                  minutes past 12:00 AM.
```

It should be noted that, in the preferred embodiment, the algorithm is written to allow the start and stop times to "wrap" past midnight. For example, the nighttime settings for start and stop could be 23:00 and 03:00 respectively.

Figure 3A:
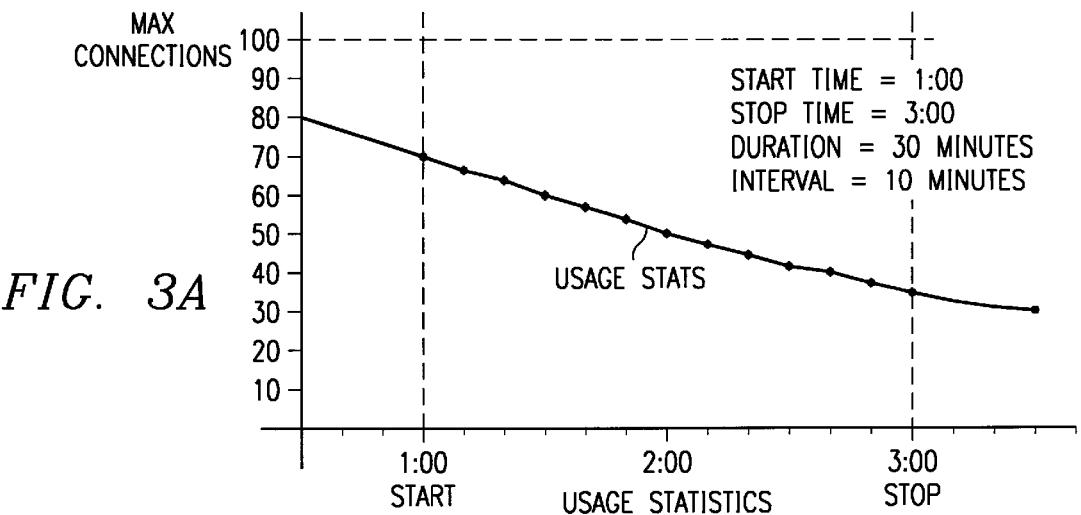
FIGS. 3A–3B are plots of Usage Statistics and the corresponding load map generated over a given time interval illustrating how the agent regenerates its agent load map.
Figure 3B:
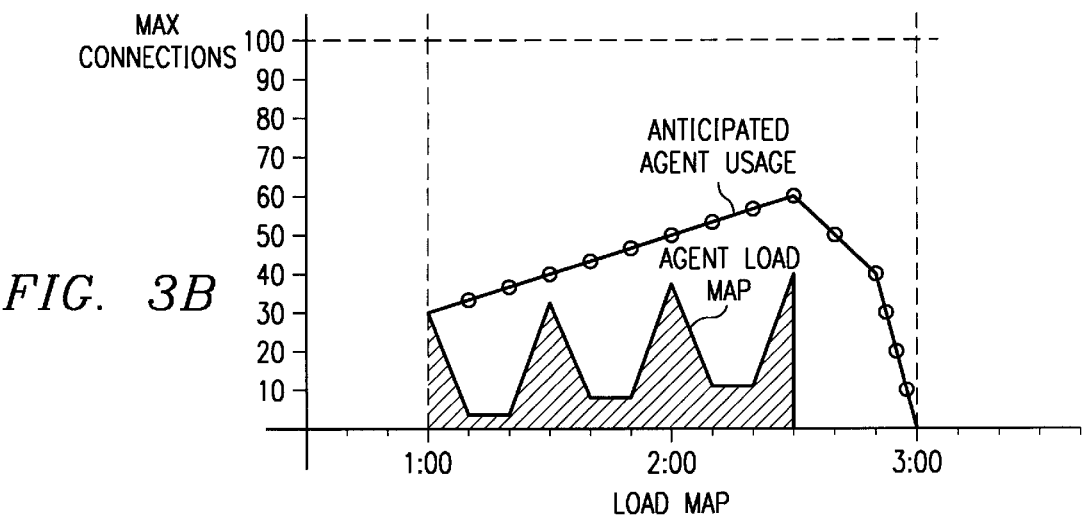
Figure 4A:
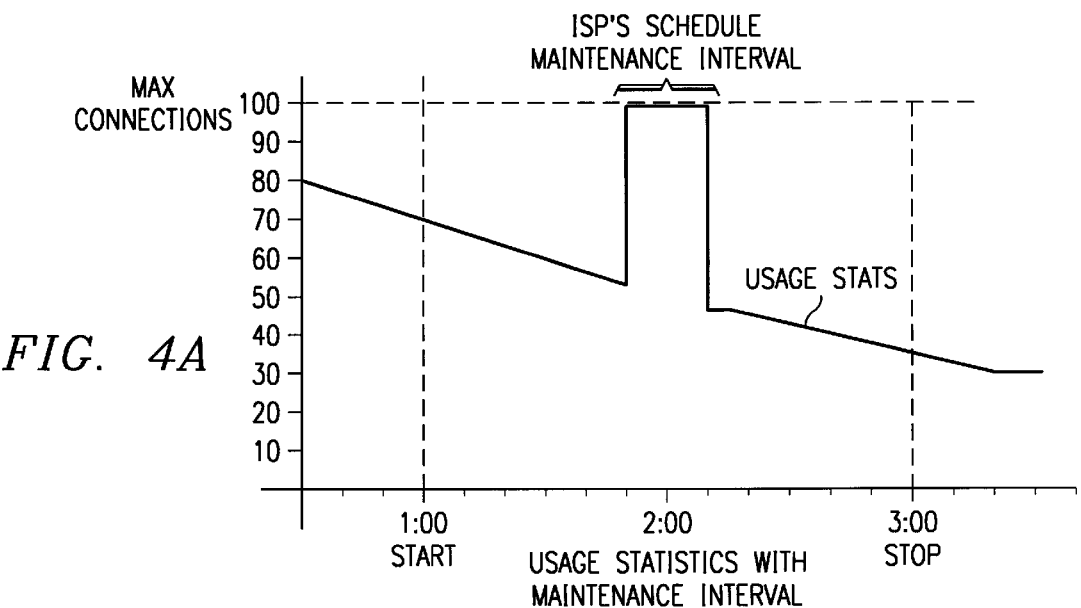

The usage statistics are preferably stored in a file as consecutive 2-byte integers in big-endian format. Other formats may be used as well. The samples preferably start at midnight with each consecutive integer thereafter representing the next sample, e.g. the second integer would represent the sample take at 12:00 AM+deltaTime, followed by 12:00 AM+2×deltaTime, and so forth. FIG. 3A illustrates representative usage statistics collected over a particular interval and FIG. 3B illustrates a representative agent load table for a particular agent at a client machine. FIGS. 4A–4B show variations of these plots resulting from the ISP's insertion of a server maintenance interval.

The preferred format of the INI File is as follows:

| | |
|---|---|
| UsageStatistics=filename | //Fully qualified pathname of the file containing the usage statistics. |
| MaxUsage=xxxx | //The maximum number of connections available from the ISP. |
| DeltaTime=mmmm | //Total duration of nightly maintenance in minutes. Must be a multiple of DeltaTime. |
| BusyHistory=x | //Information saved by maintmgr indicating the success/failure of first connect attempts. |
| BusyHistoryLength=xx | //The number of days to record in the history (16 days max). |
| OverloadThreshold=xx | //If the number of busy days (TRUE bits) in the BusyHistory exceeds this number, and the RescheduleDelay has been satisfied, kick off reschedule (Overload Threshold must be <=BusyHistoryLength). |
| RescheduleDelay=xx | //Must wait at least this many days before attempting another reschedule. |
| StartTime=hhmm | //The start of the daytime maintenance interval. 24 hour clock. Multiple of DeltaTime. |
| StopTime=hhmm | //The end of the daytime maintenance interval." |
| DaysSinceLastResched=x | //Information saved by maintmgr indicating how many days since the last reschedule. |

The present invention provides numerous advantages over the prior art. Foremost, each Web agent generates its own schedule within some given constraints set by the central authority. The actual schedule is determined "statistically." The rescheduling algorithm and the load balancing algorithm work together to provide a self-correcting statistical mechanism for balancing the overall load placed on an ISP by a large number of Web agents. In particular, the load balancing algorithm produces the "agent load map," which is the table of weighted start times for each of the Web agents. In operation, a given Web agent starts up at the same time each day. However, if the given Web agent determines that it needs to readjust that start time, it does so dynamically based on the statistical information downloaded (to all the clients) from the ISP. Preferably, each client machine agent periodically connects to the network and the ISP to determine whether updated statistics have been made available since a given time. If the statistics have been updated by the ISP, they are distributed to the Web client agent for use in the rescheduling algorithm. That algorithm is used to make any adjustments to the agent's schedule.

Alternatively, the ISP distributes new (non-agent) usage statistics periodically, or upon a change in a given parameter (such as the maintenance period duration). Yet another alternative is to have the ISP distribute new statistics upon a change in the ISP's service level which may occur, for example when the total number of agents changes, or when there is some change in the number of supported phone connections.

Figure 5D:
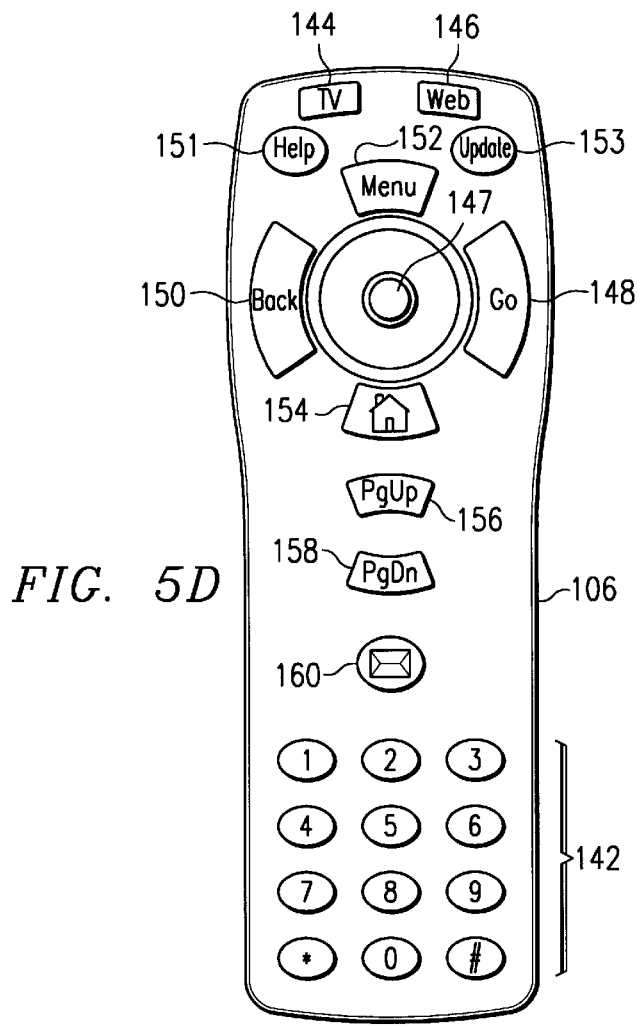
FIG. 5D is a pictorial representation of a remote control unit associated with the data processing system unit.

In the preferred embodiment, the Internet client is a data processing system or a so-called "Web appliance" such as illustrated in FIGS. 5A–5D and 6. FIG. 5A is a pictorial representation of the data processing system as a whole. Data processing system 100 in the depicted example provides, with minimal economic costs for hardware to the user, access to the Internet. Data processing system 100 includes a data processing unit 102. Data processing unit 102 is preferably sized to fit in typical entertainment centers and provides all required functionality, which is conventionally found in personal computers, to enable a user to "browse" the Internet. Additionally, data processing unit 102 may provide other common functions such as serving as an answering machine or receiving facsimile transmissions.

Data processing unit 102 is connected to television 104 for display of graphical information. Television 104 may be any suitable television, although color televisions with an S-Video input will provide better presentations of the graphical information. Data processing unit 102 may be connected to television 104 through a standard coaxial cable connection. A remote control unit 106 allows a user to interact with and control data processing unit 102. Remote control unit 106 allows a user to interact with and control data processing unit 102. Remote control unit 106 emits infrared (IR) signals, preferably modulated at a different frequency than the normal television, stereo, and VCR infrared remote control frequencies in order to avoid interference. Remote control unit 106 provides the functionality of a pointing device (such as a mouse, glidepoint, trackball or the like) in conventional personal computers, including the ability to move a cursor on a display and select items.

FIG. 5B is a pictorial representation of the front panel of data processing unit 102. The front panel includes an infrared window 108 for receiving signals from remote control unit 106 and for transmitting infrared signals. Data processing unit 102 may transmit infrared signals to be reflected off objects or surfaces, allowing data processing unit 102 to automatically control television 104 and other infrared remote controlled devices. Volume control 110 permits adjustment of the sound level emanating from a speaker within data processing unit 102 or from television 104. A plurality of light-emitting diode (LED) indicators 112 provide an indication to the user of when data processing unit 102 is on, whether the user has messages, whether the modem/phone line is in use, or whether data processing unit 102 requires service.

FIG. 5C is a pictorial representation of the rear panel of data processing unit 102. A three wire (ground included) insulated power cord 114 passes through the rear panel. Standard telephone jacks 116 and 118 on the rear panel provide an input to a modem from the phone line and an output to a handset (not shown). The real panel also provides a standard computer keyboard connection 120, mouse port 122, computer monitor port 124, printer port 126, and an additional serial port 128. These connections may be employed to allow data processing unit 102 to operate in the manner of a conventional personal computer. Game port 130 on the rear panel provides a connection for a joystick or other gaming control device (glove, etc.). Infrared extension jack 132 allows a cabled infrared LED to be utilized to transmit infrared signals. Microphone jack 134 allows an external microphone to be connected to data processing unit 102.

Video connection 136, a standard coaxial cable connector, connects to the video-in terminal of television 104 or a video cassette recorder (not shown). Left and right audio jacks 138 connect to the corresponding audio-in connectors on television 104 or to a stereo (not shown). If the user has S-Video input, then S-Video connection 140 may be used to connect to television 104 to provide a better picture than the composite signal. If television 104 has no video inputs, an external channel ¾ modulator (not shown) may be connected in-line with the antenna connection.

FIG. 5D is a pictorial representation of remote control unit 106. Similar to a standard telephone keypad, remote control unit 106 includes buttons 142 for Arabic numerals 0 through 9, the asterisk or "star" symbol (*), and the pound sign (#). Remote control unit also includes "TV" button 144 for selectively viewing television broadcasts and "Web" button 146 for initiating "browsing" of the Internet. Pressing "Web" button 146 will cause data processing unit 102 to initiate modem dial-up of the user's Internet service provider and display the start-up screen for an Internet browser.

A pointing device 147, which is preferably a trackpoint or "button" pointing device, is included on remote control unit 106 and allows a user to manipulate a cursor on the display of television 104. "Go" and "Back" buttons 148 and 150, respectively, allow a user to select an option or return to a previous selection. "Help" button 151 causes context-sensitive help to be displayed or otherwise provided. "Menu" button 152 causes a context-sensitive menu of options to be displayed, and "Update" button 153 will update the options displayed based on the user's input, while home button 154 allows the user to return to a default display of options. "PgUp" and "PgDn" buttons 156 and 158 allows the user to change the context of the display in display-sized blocks rather than by scrolling. The message button 160 allows the user to retrieve messages.

In addition to, or in lieu of, remote control unit 106, an infrared keyboard (not shown) with an integral pointing device may be used to control data processing unit 102. The integral pointing device is preferably a trackpoint or button type of pointing device. A wired keyboard (also not shown) may also be used through keyboard connection 120, and a wired pointing device such as a mouse or trackball may be used through mouse port 122. When a user has one or more of the remote control unit 106, infrared keyboard, wired keyboard and/or wired pointing device operable, the active device locks out all others until a prescribed period of inactivity has passed.

Figure 6:
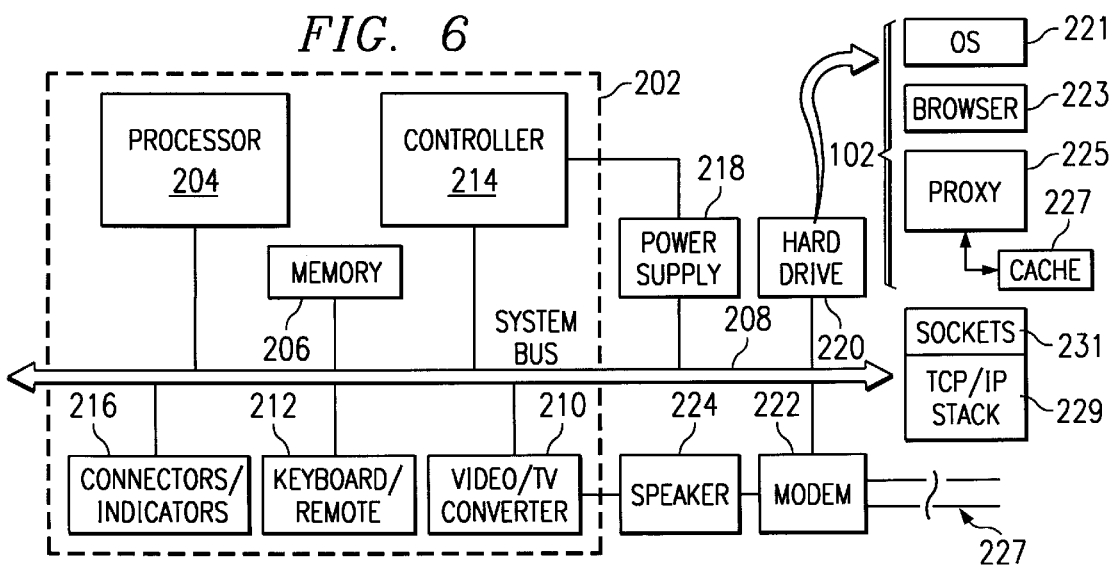
FIG. 6 is a block diagram of the major components of the data processing system unit.

Referring now to FIG. 6, a block diagram for the major components of data processing unit 102 is portrayed. As with conventional personal computers, data processing unit 102 includes a motherboard 202 containing a processor 204 and memory 206 connected to system bus 280. Processor 205 is preferably at least a 486 class processor operating at or above 100 MHz. Memory 206 may include cache memory and/or video RAM. Processor 205, memory 206, and system bus 208 operate in the same manner as corresponding components in a conventional data processing system.

Video/TV converter 210, located on motherboard 202 and connected to system bus 208, generates computer video signals for computer monitors, a composite television signal, and an S-Video signal. The functionality of Video/TV converter 210 may be achieved through a Trident TVG9685 video chip in conjunction with an Analog Devices AD722 converter chip. Video/TV converter 210 may require loading of special operating system device drivers.

Keyboard/remote control interface unit 212 on motherboard 202 receives keyboard codes through controller 214, regardless of whether a wired keyboard/pointing device or an infrared keyboard/remote control is being employed. Infrared remote control unit 106 transmits signals which are ultimately sent to the serial port as control signals generated by conventional mouse or pointing device movements. Two buttons on remote control unit 106 are interpreted identically to the two buttons on a conventional mouse, while the remainder of the buttons transmit signals corresponding to keystrokes on an infrared keyboard. Thus, remote control unit 106 has a subset of the function provided by an infrared keyboard.

Connectors/indicators 216 on motherboard 202 provide some of the connections and indicators on data processing unit 102 described above, Other connections are associated with and found on other components. For example, telephone jacks 116 and 118 are located on modem 222. The power indicator within connectors/indicators 216 is controlled by controller 214.

External to motherboard 202 in the depicted example are power supply 218, hard drive 220, modem 222 and speaker 224. Power supply 218 is a conventional power supply except that it receives a control signal from controller 214 which effects shut down of all power to motherboard 202, hard drive 220 and modem 222. In some recovery situations, removing power and rebooting is the only guaranteed method of resetting all of these devices to a known state. Thus, power supply 218, in response to a signal from controller 214, is capable of powering down and restarting data processing unit 102.

Controller 214 is preferably one or more of the 805x family controllers. Controller 214 receives and processes input from infrared remote control 106, infrared keyboard, wired keyboard, or wired mouse. When one keyboard or pointing device is used, all others are locked out (ignored) until none have been active for a prescribed period. Then the first keyboard or pointing device to generate activity locks out all others. Controller 214 also directly controls all LED indicators except that indicating modem use. As part of the failure recovery system, controller 214 specifies the boot sector selection during any power off-on cycle.

Hard drive 220 contains operating system and applications software for data processing unit 102, which preferably includes IBM DOS 7.0, a product of International Business Machines Corporation in Armonk, N.Y.; an operating system 221 such as Windows 3.1 (or higher), a product of Microsoft Corporation in Redmond, Wash.; and a browser 223 such as Netscape Navigator (Version 1.0 or higher), a product of Netscape Communications Corporation in Mountain View, Calif. Hard drive 220 may also support an SMTP mechanism to provide electronic mail, an FTP mechanism to facilitate file transfers from Internet FTP sites, and other Internet protocol mechanisms, all in a known manner. Of course, the software identified above is merely representative, as other known programs may be used in the alternative or by way of addition. Also, minor modifications of these software packages may be desirable to optimize performance of data processing unit 102.

Modem 222 may be any suitable modem used in conventional data processing systems, but is preferably a 33.6 kbps modem supporting the V.42bis, V.34, V.17 Fax, MNP 1–5, and AT command sets. To maintain the slim height of data processing system 102, modem 222 is preferably is inserted into a slot mounted sideways on motherboard 202. Modem 222 is connected to a physical communication link 227, which, in turn, in connected or connectable to the Internet (not shown).

Those skilled in the art will recognize that the components depicted in FIGS. 5A–5D and 6 and described above may be varied for specific applications or embodiments. Such variations in which the present invention may be implemented are considered to be within the spirit and scope of the present invention.

According to the invention, the client machine (typically the hard drive 220) also includes a proxy 225. Preferably, the proxy is implemented in software and includes a cache 227 associated therewith. The cache may be integral to the proxy or logically associated therewith. The cache preferably has a size up to several hundred megabytes, which is substantially larger than the standard cache associated with a browser such as Netscape Navigator. The client machine also includes a protocol stack 229 (e.g., a TCP/IP protocol stack) and a sockets mechanism 231, which are used to support communications in a known manner. According to the invention, the proxy 225 is advantageously located on the client along with the browser. Thus, the proxy is sometimes referred to as a "client side" proxy.

Preferably, the proxy starts up when the Web appliance is booted up. Connectivity between the proxy and the browser is achieved using the sockets mechanism by configuring the browser to pass the HTTP requests to the proxy. To send an HTTP GET request, the browser creates a packet (including the URL and other information) and then opens a socket using the sockets mechanism. The packet is then sent to the IP address/port number to service the HTTP request. Thus, when the browser issues an HTTP GET request, it binds to the socket and sends the request. The request is then intercepted and processed by the proxy instead of being sent directly over the network, all in the manner previously described.

Although in the preferred embodiment the client machine is a Web "appliance", this is not a requirement of the present invention. Thus, a client machine 10 may be a personal computer such as a desktop of notebook computer, e.g., an IBM® or IBM-compatible machine running under the OS/2® operating system, an IBM ThinkPad® machine, or some other Intel x86 or Pentium®-based computer running Windows '95 (or the like) operating system.

A representative server platform comprises an IBM RISC System/6000 computer (a reduced instruction set of so-called RISC-based workstation) running the AIX (Advanced Interactive Executive Version 4.1 and above) Operating System 21 and Server program(s) 22. The platform 20 also includes a graphical user interface (GUI) 23 for management and administration. It may also include an application programming interface (API) 24. HTTP GET requests are transferred from the client machine to the server platform, typically via the dial-up computer network, to obtain documents or objects formatted according to HTML or some other markup language. While the above platform is useful, any other suitable hardware/operating system/server software may be used.

One of the preferred implementations of the client side or server side mechanisms of the invention is as a set of instructions (program code) in a code module resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network.

In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

As used herein, "Web client" should be broadly construed to mean any computer or component thereof directly or indirectly connected or connectable in any known or later-developed manner to a computer network, such as the Internet. The term "Web server" should also be broadly construed to mean a computer, computer platform, an adjunct to a computer or platform, or any component thereof. Of course, a "client" should be broadly construed to mean one who requests or gets the file, and "server" is the entity which downloads the file. Moreover, although the present invention is described in the context of the Hypertext Markup Language (HTML), those of ordinary skill in the art will appreciate that the invention is applicable to alternative markup languages including, without limitation, SGML (Standard Generalized Markup Language) and XML (Extended Markup Language).

In addition, the term "Web appliance" should be broadly construed to cover the display system illustrated in FIGS. 5A–5D, as well as any other machine in which a browser application is associated with some television class or other display monitor. Moreover, while the preferred embodiment is illustrated in the context of a dial-up network, this is not a limitation of the present invention. There may be other "bottleneck" resources in a direct connect network that could be managed indirectly by using this approach. For instance, clients in an intranet that are all going through a firewall (which is the bottleneck) may be managed using the inventive technique. resource we are managing is the phone connections.

The term "agent" should be broadly construed as any application running on a client machine that performs some task or tasks on behalf of a user of the machine. As used herein, "agent" should not be limited to a particular Web agent having any particular defined set of Internet-related functions.

Having thus described our invention, what we claim as new and desire to secure by Letters Patent is set forth in the following claims.

What is claimed is:

1. A method of managing a plurality of agents vying for a resource in a computer network having a central authority, comprising the steps of:

at a given agent, generating a set of available agent start times based on resource usage statistic s and given scheduling criteria distributed to the given agent by the central authority;

at the given agent, initiating agent activity at an available agent start time selected from the set of available agent start times; and upon a given occurrence, selecting a new start time for the agent activity.

2. The method of as described in claim 1 wherein the resource being managed is a number of telephone connections in a dialup network.

3. The method as described in claim 2 wherein the resource usage statistics define a number of telephone connections in use by non-agent users during each of a given number of time intervals.

4. The method as described in claim 1 wherein the given scheduling criteria defines an operating window during which the given agent performs activities.

5. The method as described in claim 1 wherein the given scheduling criteria defines a duration of a given event during the operating window.

6. The method as described in claim 5 wherein the given event is a maintenance period during which the central authority performs a maintenance function.

7. The method as described in claim 1 wherein the agents are Web agents running on client machines and the computer network is the Internet.

8. The method as described in claim 1 wherein the available agent start time is selected at random from the set of available agent start times.

9. The method as described in claim 1 wherein the step of selecting a new start time includes generating a new set of available agent start times.

10. The method as described in claim 1 wherein the given occurrence is selected from a set of occurrences consisting of an agent connect success/failure ratio exceeding a given threshold and a distribution of updated resource usage statistics.

11. A method or managing a plurality of client machine Web agents vying for a limited number of telephone connections in a dialup computer network having a central authority, comprising the steps of:

at each client machine, generating a map of available agent start times based on resource usage statistics and given scheduling criteria distributed by the central authority;

at each client machine, initiating agent activity at an available agent start time selected from the map; and if a given client machine is unable to obtain one of the limited number of telephone connections according to a given criteria, regenerating the map of available agent start times to enable the agent associated with the given client machine to reschedule a new start time for the agent activity.

12. The method of as described in claim 11 wherein the resource usage statistics define the number of telephone connections of the dialup network in use during each of a given number of time intervals.

13. The method as described in claim 11 wherein the given scheduling criteria defines an operating window during which each of the agents may perform activities.

14. The method as described in claim 13 wherein the given scheduling criteria defines a duration of a given event during the operating window.

15. The method as described in claim 14 wherein the given event is a maintenance period during which the central authority performs a maintenance function.

16. The method as described in claim 15 wherein the central authority is an Internet Service Provider.

17. The method as described in claim 11 wherein the given criteria is an agent connect success/failure ratio exceeding a given threshold.

18. The method as described in claim 11 further including the step of initiating, at the given client machine, agent activity at an available agent start time selected from the regenerated map.

19. A computer program product in computer-readable media for use in managing an agent vying for a resource in a computer network having a central authority, the agent running on a client machine in the network for use in effecting at least one task on behalf of a user of the client machine, the computer program product comprising:
- means for generating a first set of available agent start times based on resource usage statistics and given scheduling criteria distributed to the agent by the central authority;
- means for initiating agent activity at an available agent start time selected from the first set; and
- means, responsive to a given occurrence, for generating a second set of available agent start times to enable the agent to reschedule a new start time for the agent activity.

20. The computer program product as described in claim 19 wherein the resource usage statistics define a number of telephone connections in use during each of a given number of time intervals.

21. The computer program product as described in claim 19 wherein the given scheduling criteria defines an operating window during which the agent performs activities.

22. The computer program product as described in claim 21 wherein the given scheduling criteria defines a duration of a given event during the operating window.

23. The computer program product as described in claim 19 wherein the available agent start time is selected from the map at random.

24. The computer program product as described in claim 19 wherein the initiating means is responsive to the regenerating means for initiating agent activity at an available agent start time selected from the regenerated map.

25. The computer program product as described in claim 19 wherein the given occurrence is an agent connect success/failure ratio exceeding a given threshold.

26. A computer connectable to a central authority by a dialup computer network having a limited number of telephone connections, comprising:
- a processor;
- an operating system;
- a browser;
- an agent for use in effecting at least one task on behalf of a user of the computer; and
- an agent scheduler, comprising:
  - means for generating a set of available agent start times based on resource usage statistics and given scheduling criteria distributed to the agent by the central authority;
  - means for initiating agent activity at an available agent start time selected from the set; and
  - means, responsive to a given occurrence, for regenerating a new set of available agent start times to enable the agent to reschedule a new start time for the agent activity.

27. A data processing system, comprising;
- a remote control unit; and
- a base unit connectable to a monitor for providing Internet access under the control of the remote control unit, the base unit comprising:
  - a processor having an operating system;
  - a browser application run by the operating system;
  - an agent for use in effecting at least one task on behalf of a user of the computer; and
  - an agent scheduler, comprising:
    - means for generating a set of available agent start times based on resource usage statistics and given scheduling criteria distributed to the agent by the central authority;
    - means for initiating agent activity at an available agent start time selected from the set; and
    - means, responsive to a given occurrence, for regenerating a new set of available agent start times to enable the agent to reschedule a new start time for the agent activity.

28. A computer program product in computer-readable media for use in managing a central authority to which a plurality of client machines are connectable through a limited number of connections in a dialup computer network, each of the plurality of client machines having an agent associated therewith for use in effecting at least one task on behalf of a user of the client machine, the computer program product comprising:
- means for maintaining resource usage statistics;
- means for generating given scheduling criteria to be applied by each of the agents; and
- means for distributing to the agents the resource usage statistics and the given scheduling criteria to enable the agents to schedule themselves subject to the distributed information.

29. The computer program product as described in claim 28 wherein the resource usage statistics define a number of telephone connections in use during each of a given number of time intervals.

30. The computer program product as described in claim 28 wherein the given scheduling criteria defines an operating window during which each agent may perform activities.

31. The computer program product as described in claim 30 wherein the given scheduling criteria defines a duration of a given event during the operating window.

32. The computer program product as described in claim 31 wherein the given event is a maintenance period during which the central authority performs a maintenance function.

33. The computer program product as described in claim 28 wherein the resource usage statistics and the given scheduling criteria are distributed to the agents on a periodic basis.

* * * * *